United States Patent [19]
Lippincott

[11] Patent Number: 5,133,295
[45] Date of Patent: Jul. 28, 1992

[54] VETERINARY RESTRAINT COLLAR

[76] Inventor: Judith G. Lippincott, 32181 Sailview La., Westlake, Calif. 91361

[21] Appl. No.: 770,623

[22] Filed: Oct. 3, 1991

[51] Int. Cl.$^5$ .............................................. A01K 29/00
[52] U.S. Cl. ................................................. 119/106
[58] Field of Search ................. 119/96, 106, 109; 2/129, 133

[56] References Cited

U.S. PATENT DOCUMENTS

| | | | |
|---|---|---|---|
| 1,960,312 | 5/1934 | Landorf | 2/133 |
| 2,043,153 | 6/1936 | Cox | 128/879 |
| 2,188,787 | 1/1940 | Keener | 128/879 |
| 3,013,530 | 12/1961 | Zeman | 119/106 |
| 3,036,554 | 5/1962 | Johnson | 119/106 |
| 3,072,098 | 1/1963 | Boemle | 119/96 |
| 4,200,057 | 4/1980 | Agar | 119/96 X |
| 4,476,814 | 10/1984 | Miller | 119/96 X |
| 5,012,764 | 5/1991 | Fick et al. | 119/106 |

FOREIGN PATENT DOCUMENTS

| | | | |
|---|---|---|---|
| 461057 | 6/1928 | Fed. Rep. of Germany | 128/879 |
| 434650 | 9/1935 | United Kingdom | 2/133 |

*Primary Examiner*—Paul J. Hirsch
*Assistant Examiner*—Thomas Price

[57] ABSTRACT

A veterinary restraint collar for a cat, comprising two side-by-side rings of soft, flexible and non-resilient medical padding material sewn together along their inner margins and having a drawstring passage with a "stretch" gauze drawstring in the passage. The rings have adjacent faces of thin plastic sheet material, and opposite faces of soft absorbent material, and are gathered to form radial pleats. The rings stand out from the neck hole to form a flexible barrier restricting the animals's ability to reach portions of its body with its mouth.

13 Claims, 1 Drawing Sheet

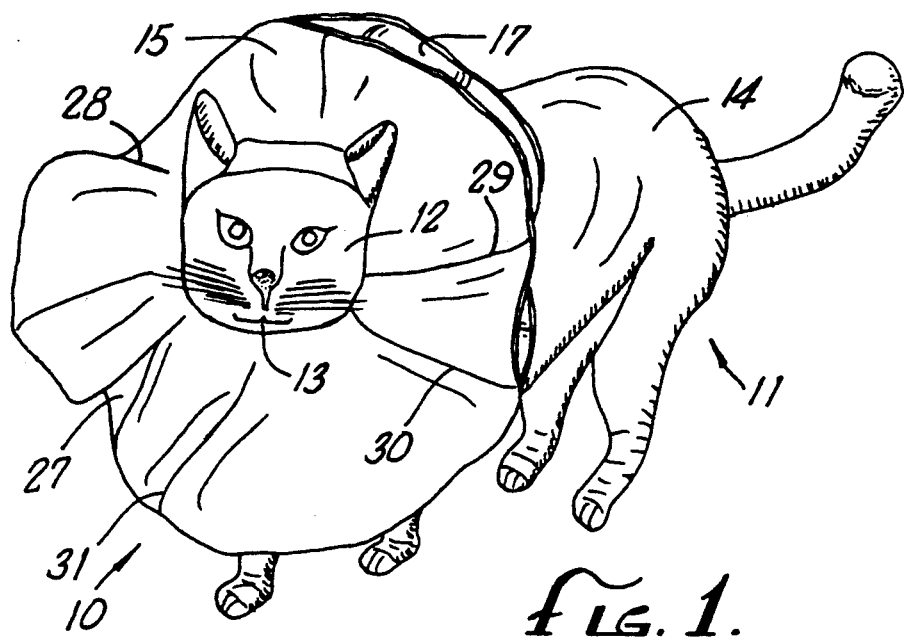
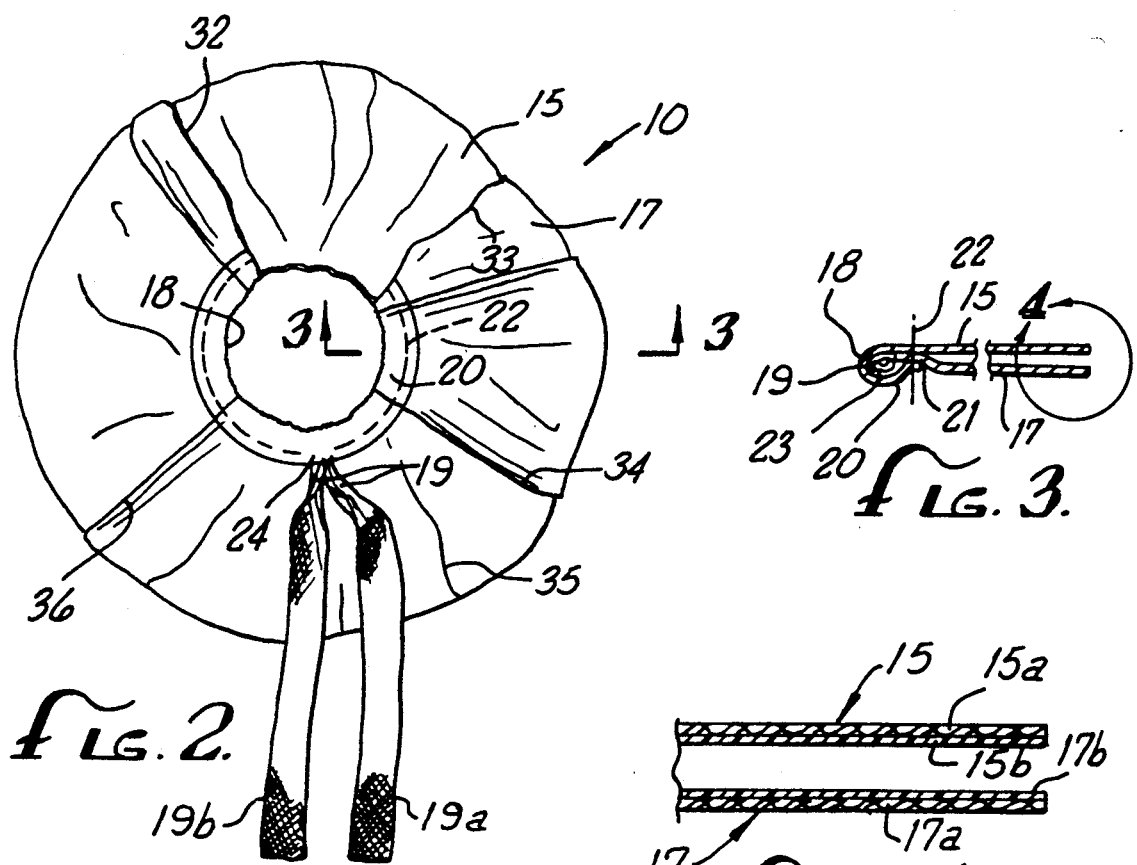
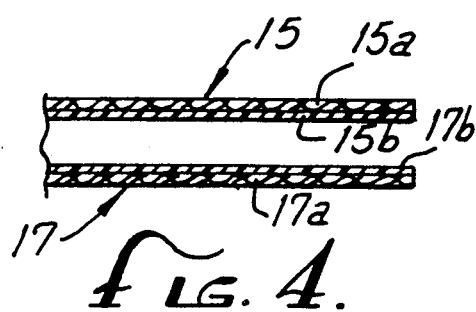

VETERINARY RESTRAINT COLLAR

BACKGROUND OF THE INVENTION

This invention relates to veterinary protective devices for animals such as cats or dogs, and has particular reference to veterinary restraint collars to be placed around an animal's neck in order to restrict access of the animal's mouth to the remainder of its body, or to restrict scratching or pawing at the head.

Protective devices for these general purposes have been known and used for many years, most frequently when an animal has a wound or an infected or otherwise sensitive area on its body, or has had surgery in an area that requires protection from biting, chewing or licking.

Typically, such a protective device is composed of relatively hard plastic or other relatively rigid material that is shaped into a truncated cone, with a center hole at the smaller end for fitting snugly around the neck of the animal and with a flaring larger end that extends forwardly alongside the animal's head and substantially surrounds its mouth. These have been referred to as "Elizabethan" collars because of their appearance, and are generally very uncomfortable for the animal to wear.

Various expedients have been used for tightening such a collar around the animal's neck and holding it in place against the animal's predictable efforts to disengage itself from the collar. Examples of these are a hook-and-loop closure on a sheet of resiliently flexible plastic that is wrapped around the animal's neck and clamped in place, as disclosed in U.S. Pat. No. 5,012,764; a similarly shaped semi-rigid shield of plastic sheet material that is disclosed in U.S. Pat. No. 4,200,057, in which the ends are overlapped and stapled or riveted together; and a somewhat similar collar of rubber, elastomer or flexible plastic sheet material that is formed into a frustro-conical shape with overlapping ends that are laced or riveted together, as disclosed in U.S. Pat. No. 3,036,554.

In each of these patented devices, the disclosure makes it clear that sheets must be flexible enough to be bent around the animal's neck, but should be sufficiently rigid to be shape-retaining in a forwardly extending frustro-conical shape. Little is said about the comfort of the animal, although transparent material is used in the '764 patent to reduce the anxiety of the animal, and an inner "non-chafing" ring is applied to the semi-rigid material of the '057 patent.

Other efforts to provide an effective and comfortable restraint device are shown in U.S. Pat. No. 3,013,530 where a relatively rigid plate with a center hole is positioned over the head and laced to the collar of the animal; and in U.S. Pat. No. 4,476,814 where a doughnut-like, solid, resilient foam ring encircles the animal's neck and has a gap at one end that is closed by a drawstring device. These devices appear to be efforts to make the restraint more comfortable for the animals that must wear them, but are quite cumbersome when in place, and also are relatively complex in construction and installation.

The most important disadvantage of the veterinary restraint collars that are presently available is the discomfort and anxiety that they produce in the afflicted animal. In particular, the stiff plastic "Elizabethan" collars can be tremendously annoying, and even frightening, for a pet. The objective of this invention is to alleviate these disadvantages.

SUMMARY OF THE INVENTION

The present invention provides an improved veterinary restraint collar that is substantially more comfortable and less frightening than those of the prior art, while also being relatively simple and inexpensive to produce and quick and easy to apply to an animal. To these ends, the restraint collar of the present invention comprises at least one, and preferably two, rings of soft, flexible and non-resilient material defining a neck hole and having sufficient body to stand out from the neck hole, and means, preferably an elastic drawstring, for releasably securing the collar around the animal's neck. Thus, the invention provides a soft, floppy restraint collar that provides an effective barrier without the disadvantages of the rigid or semi-rigid devices of the prior art.

A readily available and very well suited material for the rings is the laminated medical padding material sold by Johnson & Johnson as "underpads", having a soft, highly absorbent facing on one side and a thin, non-resilient plastic backing sheet on the other, and the preferred drawstring material is an elongated strip of "stretch" gauze that is slidably confined in a drawstring passage around the neck hole of the collar, with free opposite end portions that can be tied in a bow after tightening around the animal's neck.

In the double-ring form that is the preferred embodiment of the invention, the sheet plastic sides of the laminated material face each other and the soft absorbent sides face away from each other for engagement with the animal. For convenient manufacture, one ring has an integral inner flap which bends outwardly from the neck hole, and the second ring has an inner margin that is fitted between the first ring and its flap and sewn in place, leaving an opening on one side for the drawstring ends to extend out of the passage.

Other aspects and advantages of the invention will become apparent from the following detailed description, taken in conjunction with the accompanying drawings.

BRIEF DESCRIPTION OF THE DRAWINGS

FIG. 1 is a front perspective view of a veterinary restraint collar in accordance with the present invention, shown in place on the neck of an illustrative cat;

FIG. 2 is a rear elevational view of the collar of FIG. 1, with the drawstring shown untied and with an upper portion of the rear ring broken away and shown in partial cross-section;

FIG. 3 is an enlarged fragmentary cross-sectional view taken substantially along line 3—3 of FIG. 2; and FIG. 4 is an enlarged view taken within the arc 4 of FIG. 3.

DETAILED DESCRIPTION OF THE PREFERRED EMBODIMENT

As shown in the drawings for purposes of illustration, the invention is embodied in a veterinary restraint collar, indicated in FIGS. and 2 by the reference number 10, for use on an animal 11, herein a cat, to restrict access of the animal's head 12 and mouth 13 to the remainder of the body 14. Such restraint collars are used when there is a sensitive area on the cat's body, legs or tail, such as a wound or infection that has been treated, or a surgical incision that is healing, or when scratching or pawing at the head or ears is to be restricted.

As can be seen most clearly in FIGS. 1 and 2, the illustrative collar 10 comprises two soft, floppy rings 15 and 17 that are of approximately the same size and shape and are disposed in side-by-side relation. The rings are joined together along their radially inner margins to form a generally circular neck hole 18 (FIG. 2) for receiving the neck of the cat. A drawstring 19 is provided around the neck hole for tightening of the collar and releasably securing it in place.

Herein, the front collar ring 15 of the collar 10 has an integral inner flap 20 around its inner margin that extends outwardly along the rear side of this ring, and the rear collar ring 17 has an inner margin 21 that is inserted between the front ring and the flap. A circular stitch 22 is sewn through the flap to join the two collar rings together along a circular line spaced outwardly from the neck hole 18, thus defining a circular drawstring passage 23 in the front ring 15 in which the drawstring 19 is slidably disposed as shown in FIG. 3. The opposite end portions $19^a$ and $19^b$ of the drawstring extend out of the passage 23 through an opening at 24, formed by a gap in the stitch 22, and can be tied together around the animal's neck, preferably with a bow knot (not shown). The preferred location for the bow-knot is behind the collar 10, but this is not particularly significant. It will be seen that the collar is effectively reversible in any event.

The collar rings 15 and 17 of the collar 10 of the present invention are composed of soft, flexible and non-resilient material that has sufficient body to form a floppy collar that stands out to some extent from the neck opening but insufficient rigidity to give the animal the feeling of having its head confined, in a frustro-conical funnel, as in many of the prior art devices, or otherwise. In this way, the invention significantly reduces the discomfort of the animal, and produces a minimal interference with its comfort and ability to move around. In effect, the invention provides a soft, flexible barrier between the head and the rest of the body, rather than an annoying, frightening rigid or semi-rigid "container" around the head.

While various types of modern materials are available for use in making the collar rings 15 and 17, the preferred material is the laminated medical padding material sold by Johnson & Johnson as "underpads". This material has on one side a soft layer $15^a$, $17^a$ (FIG. 4) of non-resilient absorbent material, and has on the other side a thin lay $15^b$, $17^b$ of plastic sheet material that also is non-resilient. This sheet material adds strength and durability to the rings, as well as forming a moisture barrier.

With this type of laminated material, the front collar ring 15 may be positioned to provide a front face of the collar 10 that is soft and absorbent, for optimum comfort and reduced anxiety. By reversing the material for the rear collar ring 17, the rear face of collar also is made soft and absorbent, for reversibility and for further comfort of the animal.

It will be noted that the rings 15 and 17 are gathered around the neck hole 18, forming radiating irregular folds or pleats in the rings as indicated at 27, 28, 29, 30 and 31 in FIG. 1, and at 32, 33, 34, 35 and 36 in FIG. 2 While these can be eliminated by cutting the material in bands of uniform width, it is believed that the gathers contribute desirable body to the body of the collar and its ability to stand out from the neck holes, without materially increasing the discomfort of the animal.

It also is important for optimum comfort of the animal that the drawstring 19 be composed of elastic material, to avoid binding the animal's neck in the neck hole 18. Herein, the preferred material is "stretch" gauze, which is available in narrow strips that will yield considerably without releasing the collar. A suitable gauze material is sold by Osco Drugs as "Conform Bandage" material.

The dimensions of the collar 10 will be varied for animals of different size and kinds, and can be determined empirically by testing with different animals It is believe desirable to have a radial width somewhat greater than the distance from the collar to the animal's mouth—for a cat, a width in the range of four to six inches. For larger animals, of course, wider rings will be used. In general, a range of widths from four to twelve inches will provide adequate protection for most animals of moderate size, and particularly for small animals.

It also should be noted that a collar 10 in accordance with the present invention is not absolutely indestructible, inasmuch as the preferred material, though tough, can be chewed through by a sharp-toothed and persistent animal. It has been found, however, that the position of the collar behind the mouth makes it difficult for the animal to chew, and the relative comfort of this collar leads to far less distress of the animal and thus to far less effort to escape from the collar. The result is that destruction by chewing is not a serious problem. Moreover, in view of the relatively low cost of the materials and manufacture of such collars, they are disposable if damaged and when soiled, and quite inexpensive to replace.

From the foregoing, it will be seen that a veterinary restraint collar in accordance with the present invention will provide an effective protective barrier without the high degree of discomfort created by the prior art devices, particularly the frustro-conical "Elizabethan" collars that still are widely used, while at the same time being relatively inexpensive and very easy to apply to an animal. It also will be evident that, while a particular embodiment of the invention has been illustrated and described, various modifications and changes may be made by those skilled in the art without departing from the spirit and scope of the invention.

I claim as my invention:

1. A veterinary restraint collar for use around the neck of an animal such as a cat or dog to restrict access of the animal's head and mouth to the remainder of its body, comprising:

two side-by-side and generally concentric rings of soft, flexible and non-resilient material joined together along their radially inner margins to form a neck hole for receiving the neck of an animal;

means defining a drawstring-retaining passage in said rings around said neck hole and an opening out of said passage on one side of said neck hole;

and an elongated drawstring composed of resiliently stretchable, elastic fabric disposed in said drawstring passage and having opposite end portions extending out of said passage through said opening, for use in tightening said collar around the neck of the animal and to be tied to secure the collar releasably in place;

each of said rings having a layer of soft and absorbent material on the side thereof opposite the other of said rings and a layer of thin, flexible and non-resilient plastic sheet material on the side thereof adjacent the other of said rings, providing sufficient body to said material to cause it to stand out away from the neck hole;

and said rings having approximately the same radial width sufficient to extend outwardly from the neck of the animal immediately behind its head and lie between the head and mouth and parts of the animal's body when the animal attempts to reach those parts with its mouth.

2. A veterinary restraint collar as defined in claim 1 wherein said soft, flexible material is laminated medical padding having a soft, absorbent backing on one side and a flexible plastic sheet o the other.

3. A veterinary restraint collar as defined in claim 1 wherein the radial width of said rings is between three inches and ten inches.

4. A veterinary restraint collar as defined in claim 1 wherein the collar is for use on cats and the radial width of said rings is between four and six inches.

5. A veterinary restraint collar as defined in claim 1 wherein such means defining a drawstring-retaining passage is an internal, integral flap on one of said rings extending outwardly from the neck hole alongside the inner margin of the other of said rings, and a thread stitching said flap and said rings together along a circle spaced outwardly from said neck hole, thereby defining said passage around the neck hole.

6. A veterinary restraint collar as defined in claim 1 wherein said drawstring is a length of flexible gauze.

7. A veterinary restraint collar as defined in claim 1 wherein said rings are gathered around said neck hole and have irregular gathered pleats extending radially outward from the neck hole.

8. A veterinary restraint collar for an animal such as a cat or dog having a neck and a mouth spaced a predetermined approximate distance from the neck, said collar comprising at least one ring of soft, flexible and non-resilient material defining a neck hole and having a radial width substantially greater than said predetermined approximate distance;

said material having sufficient body and width to stand out away from the neck hole and form a floppy barrier around the neck;

and means for releasably securing the collar around the neck of the animal to restrict access of the animal's head to other parts of the animal's body.

9. A veterinary restraint collar for an animal such as a cat or dog as defined in claim 9 wherein said means for releasably securing the collar is a drawstring mounted in the collar around said center hole and composed of elastic material.

10. A veterinary restraint collar for an animal such as a cat or dog as defined in claim 9 wherein said material is laminated medical padding material having one side comprising a thin and flexible sheet of non-resilient plastic and one side composed of soft absorbent facing material for facing forwardly when the collar is in place on the animal.

11. A veterinary restraint collar for an animal such as a cat or dog as defined in claim 11 further including a second ring of said material substantially concentric with the first ring and joined thereto around said neck opening with the plastic sheet side facing toward the plastic sheet side of the first ring.

12. A veterinary restraint collar for an animal such as a cat or dog as defined in claim 9 wherein the radial width of said ring is at least four to six inches.

13. A veterinary restraint collar for an animal such as a cat or dog as defined in claim 8 wherein the radial width of said ring is in the range of four to twelve inches.

* * * * *

UNITED STATES PATENT AND TRADEMARK OFFICE
CERTIFICATE OF CORRECTION

PATENT NO. : 5,133,295

DATED : July 28, 1992

INVENTOR(S) : Judith G. Lippincott

It is certified that error appears in the above-identified patent and that said Letters Patent is hereby corrected as shown below:

Column 2, line 62, after the word "FIGS." insert --1-- before "and 2", thus should read --FIGS. 1 and 2--.

In the Claims, Column 6, lines 13, 18 and 31, reference numeral "9", each occurence, should read --8--; line 25 reference numeral "11" should read --10--

Signed and Sealed this

Fourteenth Day of September, 1993

Attest:

BRUCE LEHMAN

Attesting Officer      Commissioner of Patents and Trademarks